Aug. 1, 1944. J. L. STRATTON 2,354,930
ELECTRIC CONTROL CIRCUIT
Original Filed Feb. 24, 1941

Inventor:
Jerry L. Stratton,
by Harry E. Dunham
His Attorney.

Patented Aug. 1, 1944

2,354,930

UNITED STATES PATENT OFFICE 2,354,930

ELECTRIC CONTROL CIRCUIT

Jerry L. Stratton, Schenectady, N. Y., assignor to General Electric Company, a corporation of New York Original application February 24, 1941, Serial No. 380,227, now Patent No. 2,330,638, dated September 28, 1943. Divided and this application February 11, 1942, Serial No. 430,473

7 Claims. (Cl. 250—27)

My invention relates to electric control circuits and more particularly to control and amplifying circuits for controlling the energization of a load circuit from an associated supply circuit.

This application is a division of my copending application Serial No. 380,227, filed February 24, 1941, Patent No. 2,330,638 dated September 28, 1943, and which is assigned to the assignee of the present application.

It is frequently desirable in the control of electrical apparatus to provide equipment of simple construction and arrangement which controls an operating or electrical condition of an associated circuit precisely and rapidly to maintain the condition within predetermined limits. In accordance with the teachings of my invention described hereinafter, I provide new and improved circuits of this nature.

It is an object of my invention to provide new and improved electric control circuits.

It is another object of my invention to provide new and improved electric valve control circuits.

It is a further object of my invention to provide new and improved electric valve or electronic amplifier circuits.

Briefly stated, in the illustrated embodiments of my invention I provide new and improved electric control or electronic amplifier circuits for controlling an electrical condition, such as the voltage or current, of a single or a pair of load circuits in response to an electrical condition of an associated supply circuit. The amplifier circuits may be used in conjunction with a system wherein a pair of load circuits are energized, and wherein the relative energizations of the pair of load circuits are precisely varied or controlled in response to the voltage derived from a supply or control circuit.

Figure 1:
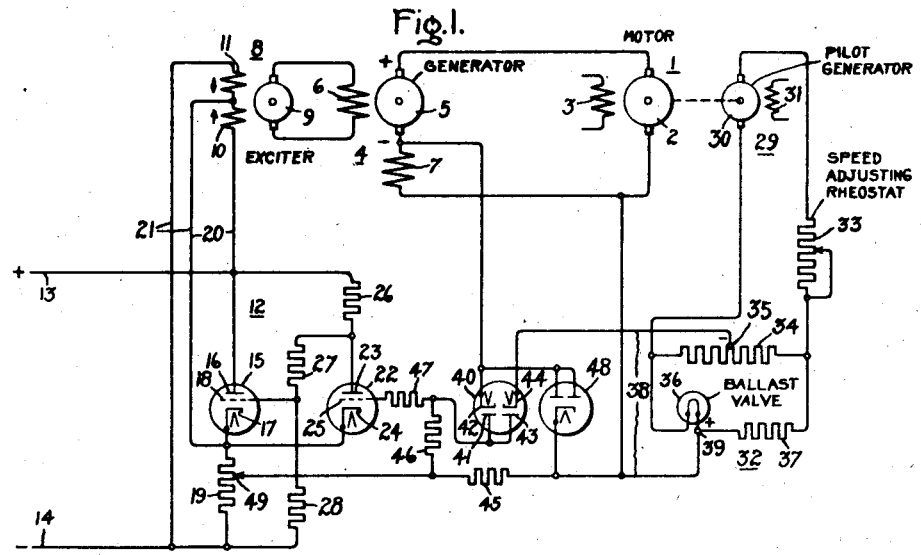
Figure 2:
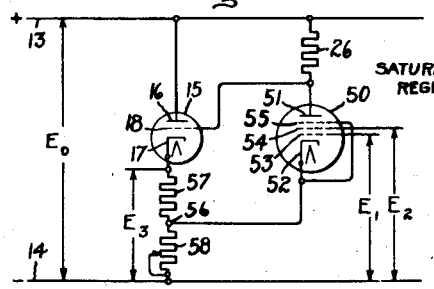
Figure 3:
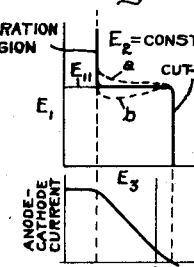
Figure 4:
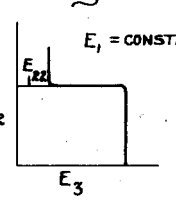
Figure 5:
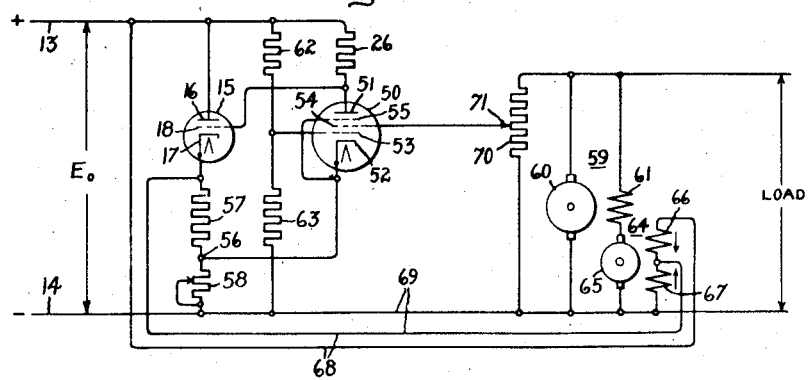

For a better understanding of my invention, reference may be had to the following description taken in connection with the accompanying drawing and its scope will be pointed out in the appended claims. Fig. 1 diagrammatically illustrates one embodiment of my invention as applied to a variable voltage control system for a direct current motor. Fig. 2 represents a modification of a part of the control circuit shown in Fig. 1, and Figs. 3 and 4 represent certain operating characteristics of the arrangement shown in Fig. 2. Fig. 5 diagrammatically illustrates a further embodiment of my invention as applied to an excitation system for a direct current generator.

My invention is diagrammatically illustrated in Fig. 1 as applied to a system for controlling an operating characteristic, such as the speed of a direct current motor 1 comprising an armature winding 2 and a field winding 3. The field winding 3 may be energized from a suitable constant voltage source. The motor 1 is connected in a variable voltage system wherein its armature voltage is varied in order to control its speed. The voltage impressed across the armature winding 2 of the motor 1 is controlled by means of a direct current generator 4 having an armature winding 5, a field winding 6 and a commutating field winding 7.

As a means for variably energizing the field winding 6 of generator 4 in order to regulate or control an output characteristic, such as the armature voltage thereof, I provide an exciter 8 having an armature winding 9 and a pair of field windings or control windings 10 and 11 which may be arranged to produce opposing magnetomotive forces, the resultant of which determines or controls the excitation of the exciter 8 and hence controls the excitation and the output voltage of generator 4.

I provide an improved electric valve amplifier or electronic amplifier 12 for controlling the relative energizations of, or the currents transmitted to, control windings 10 and 11 and which comprises a source of direct current including a positive conductor 13 and a negative conductor 14. An electronic discharge device 15 of the high vacuum type, having an anode 16, a cathode 17 and a control grid 18, is connected in series relation with a resistance 19 across the source of direct current. One of the control windings, such as control winding 10, is connected across the anode and cathode of the electronic discharge device 15 through circuit 20, and the other control winding, such as winding 11, is connected across the resistance 19 through circuit 21. Circuits 20 and 21 may be considered as control circuits for exciter 8 and as load circuits for the electronic amplifier 12. I provide means for controlling the current conducted by the electronic discharge device 15 in order to control the voltage distribution across the discharge device 15 and the resistance 19, in this manner controlling the magnitudes of the currents transmitted to control windings 10 and 11. The means for controlling electronic discharge device 15 may comprise a second electronic discharge device 22 also preferably of the high vacuum type, comprising an anode 23, a cathode 24 and a control grid 25. The anode-cathode circuit of the electronic discharge device 22 may be connected in series relation with a resistance 26, both of which are connected in series relation between the positive terminal or conductor 13 of the direct current source and the cathode 17 of the electronic discharge device 15. The cathode 25 of electronic discharge device 22 is connected to a point of the resistance 19 which is positive in potential relative to the negative conductor 14 and may be connected to the common juncture of the resistance 19 and the cathode 17 of discharge device 15. Control grid 18 of electronic discharge device 15 is connected to the anode 23 of discharge device 22 through resistance 27, and is also connected to the negative conductor 14 through resistance 28.

In order to provide an electrical quantity, such as a voltage which varies in response to a predetermined controlling influence derived from motor 1, such as the speed of motor 1, I employ a pilot generator 29 having an armature winding 30 and a field winding 31. The armature voltage of the pilot generator 29 is employed as an indicant of the speed of motor 1 and may be connected to a voltage sensitive or responsive circuit, such as a bridge circuit 32, through a voltage control and speed adjusting rheostat 33. The voltage sensitive circuit 32 comprises one branch including a resistance 34 provided with an intermediate connection 35, and the other branch includes a constant current means such as a ballast valve or resistance 36 connected in series relation with a resistance 37. An output circuit 38 of the voltage sensitive bridge circuit 32 is connected between intermediate connection 35 of resistance 34 and the common juncture 39 of the ballast resistance 36 and resistance 37.

To limit the maximum armature current of the generator 4 and hence to limit the maximum power transfer between motor 1 and generator 4, I provide a means which is responsive to the amount of current or power transfer between these two valves. This means may be of the type disclosed and claimed in United States Letters Patent No. 2,019,352 granted October 29, 1935, on an application of O. W. Livingston, which is assigned to the assignee of this application, and may include an electronic discharge device including two electric discharge paths, one provided with an anode 41 and a cathode 42 and the other of which is provided with anode 43 and cathode 44. The output circuit 38 of the bridge circuit 32 is connected to grid 25 of electronic discharge device 22 through resistances 45, 46, 47 and the electric discharge path including anode 43 and cathode 44. The left-hand discharge path provided by anode 41 and cathode 42 is connected to be responsive to the voltage drop appearing across the commutating winding 7 of generator 4. This voltage drop varies in response to the amount of current transmitted by the armature winding 5.

If the voltage drop appearing across the commutating winding 7 becomes greater than the output voltage of the bridge circuit 32, the system operates to maintain the generator armature voltage at a constant value by limiting the potential which is impressed on grid 25 of electronic discharge device 22, that is, by limiting the amount by which the grid potential may rise in the positive direction.

As a means for limiting the range of variation of the potential of grid 25 of discharge device 22 and as a means which is selectively responsive to the direction of power flow between armature winding 5 of generator 4 and armature winding 2 of motor 1, I provide a unidirectional conducting device or electric valve 48 connected to be responsive to the voltage appearing across the commutating field winding 7 of generator 4. Electric valve 48 thereby controls the potential applied to grid 25 to establish a minimum excitation of exciter 8 and a definite limit to the amount of reverse power which may be transmitted between generator 4 and motor 1.

Electronic discharge device 15 and resistance 19 are chosen so that the predominating voltage appears across the anode and cathode of electronic discharge device 15 when it is desired to fully excite the exciter 8. In other words, when the system dictates an increase of excitation of exciter 8 and, hence, an increase in the armature voltage of generator 4, the voltage appearing across the discharge device 15 is substantially greater than that appearing across resistance 19. Consequently, the control winding 10 will be energized by a current materially greater than that supplied to winding 11 and the output or armature voltage of exciter 8 will be the full or nominal output voltage.

The electronic discharge device 22 is preferably of the type having a sharp cut-off characteristic and the device 22 is operated predominately within the negative grid voltage portion of its anode-cathode current-grid voltage characteristic. The grid 25 is connected to an adjustable contact 49 of resistance 19 deriving through this resistance a negative component of voltage which is impressed on grid 25 through resistances 46 and 47. The voltage variations applied to the grid 25 are sufficient to vary the operation of the electronic discharge device 22 from cut-off to the saturation region, or vice versa, for small variations in the magnitude of the voltage appearing across the terminals of resistance 46. Consequently, the voltages appearing across the terminals of resistance 19 and the anode and cathode of discharge device 15 vary abruptly between definite predetermined values.

The operation of the embodiment of my invention diagrammatically illustrated in Fig. 1 will be explained by considering the system when it is operating to maintain the speed of motor 1 at a substantially constant value. The speed of the motor is controlled by variation of the armature voltage inasmuch as the field energization remains substantially constant. The output or armature voltage of the pilot generator 29 is indicative of the speed of motor 1 and the voltage responsive bridge circuit 32 amplifies variations in output voltage to control the conductivity of the electronic discharge devices 22 and 15. The bridge circuit 32 is designed so that the potential of intermediate connection 35 varies in response to output voltages of the pilot generator 29 and, hence, variable amounts of unidirectional current are transmitted through the circuit including resistances 45 and 46 and the electric discharge path including anode 43 and cathode 44. In this manner, the potential of the grid 25 is varied to change the operation of the discharge device 22 from cut-off to the saturation region or vice versa, and thereby change the conductivity of the discharge device 15 from one predetermined value to a second predetermined value. With the change in conductivity of the discharge device 15, the voltage distribution across the discharge device 15 and resistance 19 effects corresponding variations in the amount of current transmitted to the control windings 10 and 11 of exciter 8.

For example, if the speed of motor 1 tends to increase above the predetermined or established value, the potential of the intermediate connection 35 becomes more negative with respect to the potential of common juncture 39 causing an increase in the amount of current which is transmitted through resistances 45 and 46 and thereby causing the potential of control grid 25 to be lowered in the negative direction to a value sufficient to bias the discharge device 22 to cut-off. As a result, the potential of control grid 18 becomes more positive effecting a decrease in the voltage drop across discharge device 15 and effecting a substantial increase in the voltage drop across resistance 19. As a result, the current transmitted to control winding 10 will be abruptly decreased to a predetermined value and the current transmitted to control winding 11 will be abruptly increased to a definite value, conjointly effecting a substantial decrease in the resultant excitation of exciter 8 and causing the output voltage or armature voltage of generator 4 to decrease thereby restoring the speed of the motor 1 to the predetermined value. If, on the other hand, the speed of the motor 1 tends to decrease to a value below the predetermined value, the reverse operation takes place causing the variation in the potential of grid 25 to be of a value sufficient to cause the discharge device 25 to operate within the saturation region and, consequently, lowers the potential of grid 18 of discharge device 15 sufficiently to increase substantially its anode-cathode voltage and the current supplied to control winding 10. The voltage drop across resistance 19 decreases causing thereby a decrease in the voltage and current supplied to control winding 11. In this manner, the resultant excitation of the exciter 10 is abruptly increased tending to increase the output voltage of generator 4 and consequently restoring the speed of the motor to the desired value. It will, therefore, be appreciated that the electronic discharge device is continuously operated between cut-off and the saturated region to effect the desired control of the energization of windings 10 and 11.

If the amount of current transmitted by the armature winding 5 to the armature winding 2 of motor 1 tends to exceed a predetermined value, the voltage drop appearing across the commutating field 7 attains a value which is greater than the output voltage of the voltage responsive bridge circuit 32 so that the system then begins to maintain constant generator-armature current. This control is effected by transmitting current through the circuit including the lower terminal of armature winding 2, resistance 45, resistance 46, the electric discharge path including anode 41, cathode 42 and the common juncture of the armature winding 5 and the commutating field 7. In this manner, the potential of the grid 25 is controlled thereby controlling the energization of field winding 6 of generator 4 and effecting a limitation in the maximum value of generator-armature current. In addition, the system operates in response to the direction of power transfer between generator 4 and motor 1 by virtue of the unidirectional conducting device or electric valve 48. If the current in the armature circuit of generator 4 and motor 1 reverses, the electric valve 48 conducts current establishing a conducting path across the electric valve 49 and resistances 45 and 46. In other words, the unidirectional conducting device 48, acting in conjunction with the associated control equipment, prevents the reduction of the excitation of generator 4 and exciter 8 below definite minimum values so that the amount of reverse power flow is determined or controlled.

The electronic amplifier 12 is highly sensitive to small changes in the magnitude of the voltage appearing across resistance 46. This feature of the electronic amplifier 12 may be more readily appreciated by virtue of the following comments. The electronic amplifier 12 is arranged so that for a given input voltage applied to grid 25 of the electronic discharge device 22 obtained by adjustment of contact 49 of resistance 19, resistances 19, 28, 27 and 26 provide normal current flow through electronic discharge devices 15 and 22. This input voltage is of a polarity which makes the grid of discharge device 15 negative with respect to its cathode. If the input voltage is increased, causing the grid 18 of discharge device 15 to become more negative, its anode-cathode current will decrease causing the anode-cathode voltage to increase. As a result, the cathode-grid voltage of discharge device 22 becomes less negative and allows its anode-cathode current to increase. This increase in anode-cathode current increases the voltage appearing across resistance 19, which in turn increases the negative voltage applied to grid 18. Since the change in voltage across resistance 19 is in the same direction as the voltage applied to the grid 18, which voltage produced the change, the net voltage required from an external source to produce a given change in anode-cathode current output is substantially reduced. The amount of control or the variation in input voltage for a given output can be made very small by the proper adjustment of the contact 49 of resistance 19.

The voltage which is fed back from the resistance 19 to the grid 25 of discharge device 22 is a positive feed-back voltage; that is, it impresses on the grid 25 a voltage which varies in the same direction as the voltage appearing across the terminals of resistance 46 which is the control voltage or the input voltage for discharge device 22. As a result, any variation in the conductivity of discharge device 22 causes an accumulative effect which abruptly changes the conductivity of the discharge device 22 from cut-off to the saturated region of operation, or vice versa, for small changes in the magnitude of the control voltage.

The field or control windings 10 and 11 of exciter 8 may be proportioned so that the exciter 8 produces full output voltage when the greater portion of the voltage of the direct current source appears across the anode and cathode of the electronic discharge device 15, and to produce zero excitation of exciter 8 when the greater voltage drop is across resistance 19.

Fig. 2 diagrammatically illustrates a modification of the electronic amplifier having certain elements corresponding to the electronic amplifier 12 of Fig. 1. I employ in the arrangement of Fig. 2 an electronic discharge device 50 which may be a pentode of the high vacuum type having an anode 51, a cathode 52 and at least a pair of control grids such as control grid 53, screen grid 54 and a suppressor grid 55 which is preferably connected to be at cathode potential. The cathode 52 is connected to a point positive in potential relative to conductor 14, such as an intermediate connection or common juncture 56 of resistances 57 and 58 which, in turn, are connected in series relation between the cathode 17 of electronic discharge device 15 and the negative conductor 14 of the direct current source. The electronic amplifier of Fig. 2 operates to produce across the outside terminals of resistances 57 and 58 a voltage which varies abruptly between one predetermined value to a second predetermined value in response to small changes in control voltage impressed either on control grid 53 or screen grid 54. A suitable load circuit may be connected across the resistances 57 and 58.

In order that the electronic amplifier of Fig. 2 be made independent of variations in the voltage of the direct current source so that the system accurately responds to variations in the magnitude of the control voltage, either the control grid 53 or the screen grid 54 may be energized in response to a predetermined component of the voltage of the source. If the voltage impressed on either the control grid 53 or the screen grid 54 is maintained constant, the amplifier will operate to produce voltages across the resistances 57 and 58 represented by the operating characteristics shown in Figs. 3 and 4.

The electronic amplifier of Fig. 2 for operation at the same anode-cathode voltage will produce a greater output than the electronic amplifier shown in Fig. 1 for the reason that in the arrangement of Fig. 2 grid 18 of electronic discharge device 15 is connected directly to anode 51 of electronic discharge device 50. The voltage of the direct current source is represented as $E_0$. If $E_2$, the voltage impressed on screen grid 54, is maintained at a constant value, the voltage $E_3$, appearing across resistances 57 and 58, assumes values corresponding to the operating characteristic shown in Fig. 3 for different values of $E_1$, the voltage impressed on control grid 53. That is, for a certain range of values within which the electronic discharge device 50 is biased to cut-off, $E_3$ remains constant until a value of control voltage $E_{11}$ is reached at the time the operation of the electronic discharge 50 is abruptly varied from cut-off to the saturated region of operation. Consequently, the voltage $E_3$ decreases abruptly to a smaller value. The lower curve of Fig. 3 represents the anode-cathode current-grid voltage characteristic for the electronic discharge device 50.

In like manner, if the voltage $E_1$ impressed on control grid 53 is maintained constant and the screen grid voltage varies, the voltage variation appearing across resistances 57 and 58 assumes values corresponding to the operating characteristic shown in Fig. 4. At a particular value of screen grid voltage corresponding to $E_{22}$, the voltage appearing across the resistances 57 and 58 varies abruptly from one definite value to a second definite value.

Adjustment of contact 49 associated with resistance 19 permits control or adjustment of the shape of the characteristic curve shown in Fig. 3. By the proper adjustment of the contact 49, the central portion of the characteristic response curve lying between the cut-off and saturation regions may be horizontal, as shown by the heavy portion of the curve, or may be made to have a slope corresponding to the dotted portion $a$ or $b$. If the feed-back voltage is small, the characteristic will correspond to the dotted portion $a$, and if the feed-back voltage is increased substantially the characteristic will assume the form illustrated by part $b$. Of course, the feed-back voltage may be adjusted to produce the characteristic corresponding to the heavy portion. If the feed-back voltage is increased beyond an optimum value so that the characteristic slope lies below the horizontal, the system becomes unstable and it is, of course, desirable to adjust the contact 49 so that the central portion of the response characteristic is at least horizontal or has a slightly rising characteristic in operation from cut-off to saturation. By decreasing the amount of positive feed-back voltage, the characteristic curve lying between cut-off and saturation may be made to change from the upper heavy curve of Fig. 3 to the lower heavy curve of Fig. 3. In the latter case, no feed-back voltage is present.

I have also found that the electronic amplifier of Fig. 2 operates such that the relation between $E_0$ and $E_3$ for constant values of $E_1$ and $E_2$ is the same as the relationship between $E_1$ and $E_3$, and $E_2$ and $E_3$, except that the changes in $E_3$ occur in the opposite direction for changes in $E_1$ and $E_2$. By virtue of this relationship, if $E_0$ and $E_1$ or $E_2$ are changed proportionately, the characteristic of $E_2$ against $E_3$ or $E_1$ against $E_3$ remains unchanged. As a result, the electronic amplifier of Fig. 2 may be used as a combined voltage sensitive and amplifying circuit, since either the control grid or the screen grid may be energized by a voltage proportional to the supply voltage to introduce a compensatory effect so that the system operates to change the voltage $E_3$ from one predetermined value to a second predetermined value at precisely the same value of control voltage.

The connection between the common juncture 56 of resistances 57 and 58 and cathode 52 of electronic discharge device 50 constitutes a feed-back connection whereby a positive feed-back voltage effect is obtained. That is, the variation in potential of the cathode 52 due to the change in conductivity of discharge device 15 assists the change dictated by the control voltage impressed either on control grid 53 or screen grid 54. In this manner small changes in the value of either of these control voltages effect a substantial change in the conductivity of discharge device 50 to abruptly change its conductivity from cut-off to the saturated region, or vice versa.

I have diagrammatically illustrated another embodiment of my invention in Fig. 5 as applied to a system for controlling the output voltage of a direct current generator 59 having an armature winding 60 and a field winding 61. The electronic amplifier shown in Fig. 5 is substantially the same as that shown in Fig. 2 and corresponding elements have been assigned like reference numerals. The voltage impressed on the control grid 53 of the electronic discharge device 50 is a predetermined component of the voltage of the direct current source and may be obtained by employing a voltage divider comprising resistances 62 and 63 connected in series relation across conductors 13 and 14.

As a means for controlling the current through the field winding 61 of the direct current generator 60, I provide a suitable control means such as a buck-boost generator 64 having an armature winding 65 connected in series relation with the field winding 61 and having a pair of field or control windings 66 and 67 arranged to produce opposing magnetomotive forces so that the armature or output voltage of the buck-boost generator or exciter 64 may be made to assist or oppose the armature voltage of generator 59.

One of the control windings, such as winding 66, is connected to be energized in response to the voltage appearing across the anode and cathode of electronic discharge device 15 through circuit resistor 58, and the other winding 67 is connected to be energized in accordance with the voltage appearing across the resistances 57 and 58 through circuit 69.

As a means for controlling the electronic amplifier to be responsive to a predetermined influence derived from generator 59, such as the armature voltage of generator 59, I provide a suitable voltage divider 70 having adjustable contacts 71 connected to screen grid 54.

The control windings 66 and 67 of the buck-boost generator 64 are so proportioned that the armature voltage boosts the armature voltage of the generator 59 when armature voltage of generator 59 is below normal and bucks the armature voltage when it is above the normal or predetermined value. In other words, the output or armature voltage of the generator 64 subtracts from or adds to the armature voltage of generator 59 in controlling the resultant voltage impressed across the terminals of field winding 61.

The embodiment of my invention shown in Fig. 5 operates to maintain the armature voltage of the direct current generator 59 at a substantially constant value. The electronic amplifier responds to slight changes in the magnitude of the armature voltage to vary the relative energizations of control windings 66 and 67 of the buck-boost generator to control the magnitude and direction of the armature voltage of this latter generator and hence control the magnitude of the current in the field winding 61. Slight variations in the magnitude of the armature voltage cause rapid changes in the voltage distribution appearing across the anode and cathode of electronic discharge device 15 and across resistances 57 and 58, thereby producing rapid changes in the relative energizations of control windings 66 and 67. If it be assumed that the voltage of generator 59 rises above the predetermined value, the potential of the screen grid 54 will be proportionately raised causing the operation of discharge device 50 to change abruptly from cut-off to saturation. As a result, the current transmitted by discharge device 15 will be decreased effecting a rapid increase in its anode-cathode voltage and consequently causing the current transmitted to winding 66 to increase abruptly and effecting a decrease in the voltage applied to winding 67, thereby causing a reversal in the output voltage of the buck-boost generator 64. The armature voltage of generator 64 then opposes the output voltage of generator 59. As a result, the current through field winding 61 will be decreased causing the armature voltage of generator 51 to be restored to the predetermined value.

On the other hand, if the armature voltage of generator 59 tends to decrease below the predetermined value, the reverse operation will take place in which the energization of winding 67 will increase and the energization of winding 66 will decrease, effecting an increase in the current transmitted through field winding 61 to restore the armature voltage to the desired value.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electronic amplifier for supplying a unidirectional voltage to a load circuit which varies abruptly from one predetermined value to a second predetermined value for small changes in the magnitude of a control voltage which comprises a source of current, a resistance connected across said load circuit, an electronic discharge device connected in series relation with said resistance across said source, said electronic discharge device having a control grid, means energized from said source for controlling the potential of said control grid comprising a serially connected resistance and an electronic discharge device provided with an anode, a cathode and a control grid having a sharp cut-off characteristic, means for connecting the grid of said second mentioned discharge device to said first mentioned resistance, means for adjusting the portion of said first mentioned resistance included in the grid-cathode circuit of said second mentioned electric discharge device, means for connecting the anode of the second mentioned discharge device to the grid of the first mentioned discharge device, and means for impressing said control voltage on the control grid of the second mentioned discharge device.

2. In combination, a direct current circuit comprising a pair of conductors, a load circuit, means energized from said direct current circuit comprising a resistance provided with an intermediate connection, and an electronic discharge device, having a control grid, connected in series relation with said resistance, means for controlling the potential of said grid comprising a serially connected resistance and a second electronic discharge device connected between one conductor of said direct current circuit and said intermediate connection, said second discharge device having a pair of control grids, means for impressing on one of said pair of control grids a potential which varies in accordance with a predetermined controlling influence to vary the voltage appearing across the first mentioned resistance from one predetermined value to a second predetermined value by changing the operation of said second discharge device from cut-off to the saturated region of operation, or vice versa, and means for varying the potential of the other grid of said pair in accordance with the voltage of said direct current circuit.

3. In combination, a direct current circuit comprising a pair of conductors, a load circuit, means energized from said direct current circuit comprising a resistance provided with an intermediate connection, and an electronic discharge device, having a control grid, connected in series relation with said resistance, means for controlling the potential of said grid comprising a serially connected resistance and a second electronic discharge device connected between one conductor of said direct current circuit and said intermediate connection, said second discharge device having a pair of control grids, means for impressing on one of said pair of control grids a potential which varies in accordance with a predetermined controlling influence to vary the voltage appearing across the first mentioned resistance from one predetermined value to a second predetermined value by changing the operation of said second discharge device from cut-off to the saturated region of operation, or vice versa, and a voltage divider connected across said direct current circuit for varying the potential of the other of said pair of grids in accordance with the voltage of said direct current circuit thereby maintaining the transfer of the second discharge device from cut-off to the saturated region of operation, or vice versa, at the same value of potential impressed on said one grid irrespective of the magnitude of the voltage of the direct current circuit.

4. In combination, a direct current circuit having positive and negative conductors, a load circuit, a resistance connected across said load circuit, an electronic discharge device, having a control grid, connected in series relation with said resistance across said direct current circuit, means for controlling the potential of said grid comprising a serially connected resistance and a second electronic discharge device connected between the positive conductor of said direct current circuit and a point of said resistance positive in potential relative to the negative conductor of said direct current circuit, said second electronic discharge device having a control grid, means for adjustably connecting the control grid of said second mentioned electric discharge device to an intermediate point on said first mentioned resistance so that the feed-back voltage therefrom is sufficient to maintain the anode-cathode current of said second mentioned electric discharge device substantially constant between saturation and cut-off and means for varying the potential of the control grid of said second discharge device to control the voltage impressed across said load circuit.

5. In a combination, a direct current circuit comprising a pair of positive and negative conductors, a load circuit, means connected to said direct current circuit comprising a resistance provided with an intermediate connection and an electronic discharge device, having a control grid, connected in series relation with said resistance, said load circuit being connected across one of the elements which are connected across said pair of conductors, means for controlling the potential of said grid comprising a serially connected resistance and a second electronic discharge device having an anode-cathode circuit connected between the positive conductor of said direct current circuit and said intermediate connection, said second discharge device having a control grid connected to said negative conductor, and means for varying the portion of the first mentioned resistance between said intermediate point and said negative conductor for impressing a positive feed-back voltage on the last mentioned grid.

6. In combination, a direct current circuit having positive and negative conductors, a load circuit, means connected to said direct current circuit comprising a resistance connected across said load circuit, and an electronic discharge device, having a grid, connected in series relation with said resistance, a serially connected resistance and a second electronic discharge device connected in series relation between the positive terminal of said direct current circuit and the circuit including the first mentioned electronic discharge device and the first mentioned resistance for impressing a control voltage on said grid, said second discharge device having a grid, means including a resistance for connecting the grid of said second discharge device to said negative conductor, and means for impressing a variable voltage on the last mentioned grid to vary the conductivity of the first mentioned electronic discharge device from cut-off to the saturated region of operation, or vice versa.

7. In combination, a direct current circuit having positive and negative conductors, a load circuit, means connected to said direct current circuit comprising a resistance connected across said load circuit, an electronic discharge device, having a control grid, connected in series relation with said resistance, means for impressing a variable control potential on said grid comprising a serially connected resistance and a second electronic discharge device connected between the positive conductor and the circuit including the first mentioned discharge device and said first mentioned resistance, said second discharge device having a control grid, means for impressing a variable control voltage on the last mentioned grid, feed-back means connected between said first mentioned resistance and said second electronic discharge device for impressing thereon a positive feed-back voltage which assists the change dictated by said control voltage so that the conductivity of said second discharge device varies abruptly from cut-off to the saturated region of operation, or vice versa, for small changes in the magnitude of said control voltage and adjustable means connected between said first mentioned resistance and the grid of said second discharge device for adjusting the magnitude of said positive feed-back voltage.

JERRY L. STRATTON.